(12) United States Patent
Silva

(10) Patent No.: US 6,974,115 B2
(45) Date of Patent: Dec. 13, 2005

(54) ELECTRO-HYDROSTATIC ACTUATOR

(75) Inventor: Gabriel Silva, Baldwinsville, NY (US)

(73) Assignee: Young & Franklin Inc., Liverpool, NY (US)

( * ) Notice: Subject to any disclaimer, the term of this patent is extended or adjusted under 35 U.S.C. 154(b) by 102 days.

(21) Appl. No.: 10/316,664

(22) Filed: Dec. 11, 2002

(65) Prior Publication Data

US 2004/0113109 A1 Jun. 17, 2004

(51) Int. Cl.[7] ............................ F16K 31/124
(52) U.S. Cl. ................ 251/30.01; 251/63.6; 417/371; 60/477
(58) Field of Search ................ 251/26, 29, 30.01, 251/62, 63, 63.5, 63.6; 417/366, 367, 368, 369, 370, 371; 60/431, 432, 477

(56) References Cited

U.S. PATENT DOCUMENTS

| | | | | |
|---|---|---|---|---|
| 2,399,294 A | * | 4/1946 | Ray | 60/432 |
| 2,582,556 A | | 1/1952 | Morey | |
| 2,631,431 A | | 3/1953 | Grebe | |
| 3,572,032 A | * | 3/1971 | Terry | 60/431 |
| 3,630,645 A | | 12/1971 | Eheim | |
| 3,764,233 A | * | 10/1973 | Strickland | 417/371 |
| 3,811,279 A | * | 5/1974 | Vogeli | 251/63.5 |
| 4,198,191 A | | 4/1980 | Pierce | |
| 4,208,171 A | * | 6/1980 | Jonsson | 417/368 |
| 4,475,710 A | * | 10/1984 | Leupers | 251/30.01 |
| 4,842,244 A | * | 6/1989 | Panchison, Jr. | 251/30.01 |
| 5,285,998 A | * | 2/1994 | Zink et al. | 251/63.6 |
| 5,796,197 A | | 8/1998 | Bookout | |
| 5,848,779 A | * | 12/1998 | Murbe et al. | 251/63.6 |
| 5,898,245 A | | 4/1999 | Cochimin | |
| 5,930,852 A | | 8/1999 | Gravatt et al. | |
| 5,988,989 A | * | 11/1999 | Hobson | 417/371 |
| 6,029,448 A | * | 2/2000 | Hobson | 60/477 |
| 6,550,743 B2 | * | 4/2003 | Rountree et al. | 251/30.01 |

* cited by examiner

Primary Examiner—Eric Keasel
(74) Attorney, Agent, or Firm—Wall Marjama & Bilinski LLP

(57) ABSTRACT

An electro-hydrostatic actuator having a sealed housing filled with a dielectric fluid. A motor driven pump and electronics for controlling the pump are all immersed in the fluid. The pump is arranged to deliver fluid from the housing to a hydraulic cylinder to control the positioning of the piston rod. A solenoid operated valve is integrated as a bypass or tip valve for quick fail safe position. The actuator is ideally suited to control various types of plunger valves. In one embodiment of the invention, the hydraulic cylinder is located outside of the housing and in another embodiment the cylinder is located inside of the housing.

22 Claims, 7 Drawing Sheets

ELECTRO-HYDROSTATIC ACTUATOR

BACKGROUND OF THE INVENTION

The invention relates to an electro-hydrostatic actuator that is ideally suited to control the positioning of a valve or any other similar device.

More specifically, this invention relates to a compact electrically operated linear actuator integrates all controls and components so rapidly and efficiently heat dissipation and cooling to component parts is provided.

Current demands on power generation systems and valve controls require that the actuators be electrically controlled and include fail safe features. In many countries, linear actuator of the type herein disclosed also require certification when employed in an environment where an explosion might take place as for example in controlling valves utilized in gas or oil pipelines or in certain processing plants where volatile chemicals are used in the process. In order to gain certification, many of the actuators are housed in rather bulky complex structures, external power supply and controls that are costly to construct and difficult to service and maintain in the field. Typically, the electronic control of the actuator is designed to be located in separate remote housing having a non-hazardous controlled environment. The cabling between the actuator and the controller can be relatively long which can lead to signal transmission loses and other related difficulties.

The invention presently here provides a solution to electrical control actuation within a compact package designed to meet uniform cooling and protection for use in hazardous environments.

In U.S. Pat. No. 2,631,431 to Gerbe, there is disclosed an electrohydraulic actuator in which an electric motor is located in a tank filled with oil. The motor is equipped with a hollow shaft and the shaft of a pump impeller is slidably contained within the hollow motor shaft. The impeller can turn with the motor shaft while at the same time moving longitudinally along the axis of the motor shaft. The pump impeller is situated inside a hollow piston that is secured to a piston rod. The piston rod extends upwardly and passes out of the tank through the top wall of the tank. In operation, the motor drives the impeller at a speed so as to increase the pressure of the oil on one side of the piston to a level wherein the piston and piston rod are displaced upwardly to reposition any type of device that is secured to the piston rod. A weight or spring is used to return the piston to its home position when the motor is de-energized.

Although the Gerbe device provides for improved motor cooling, the electronic controls for the motor are situated at a location remote from the tank housing and is therefore subject to all the problems associated with transmission lines of any appreciable length. Furthermore, because the electrical unit associated with the actuator must be housed in its own non-hazardous container, the system is costly to maintain.

SUMMARY OF THE INVENTION

It is therefore a primary object of the present invention to improve electro-hydrostatic actuators.

It is a further object of the present invention to package both the electrical and mechanical components of an electro-hydrostatic actuator in a single non-hazardous housing.

A still further object of the present invention to provide fluid cooling to both the mechanical and electrical components of an electro-hydrostatic actuator.

Another object of the present invention is to provide a more compact, non-hazardous valve actuator.

Yet another object of the present invention is to reduce transmission loss typical of an electro-hydrostatic valve actuator.

These and other objects of the present invention are attained by an electro-hydrostatic actuator having a sealed housing filled with a dielectric fluid. A motor driven pump and electrical circuitry for controlling the pump are all immersed in the fluid contained within the housing. The pump is arranged to deliver fluid from the housing to a hydraulic cylinder to move the piston rod of the cylinder to a desired location along its available path of travel. In one form of the invention the piston rod is connected to the stem of a valve and serves to control the flow of a fluid through the valve.

BRIEF DESCRIPTION OF THE DRAWINGS

For a further understanding of these and objects of the present invention, reference will be made to the following detailed description of the invention which is to be read in association with the accompanying drawings, wherein.

DETAILED DESCRIPTION OF THE INVENTION

Figure 1:
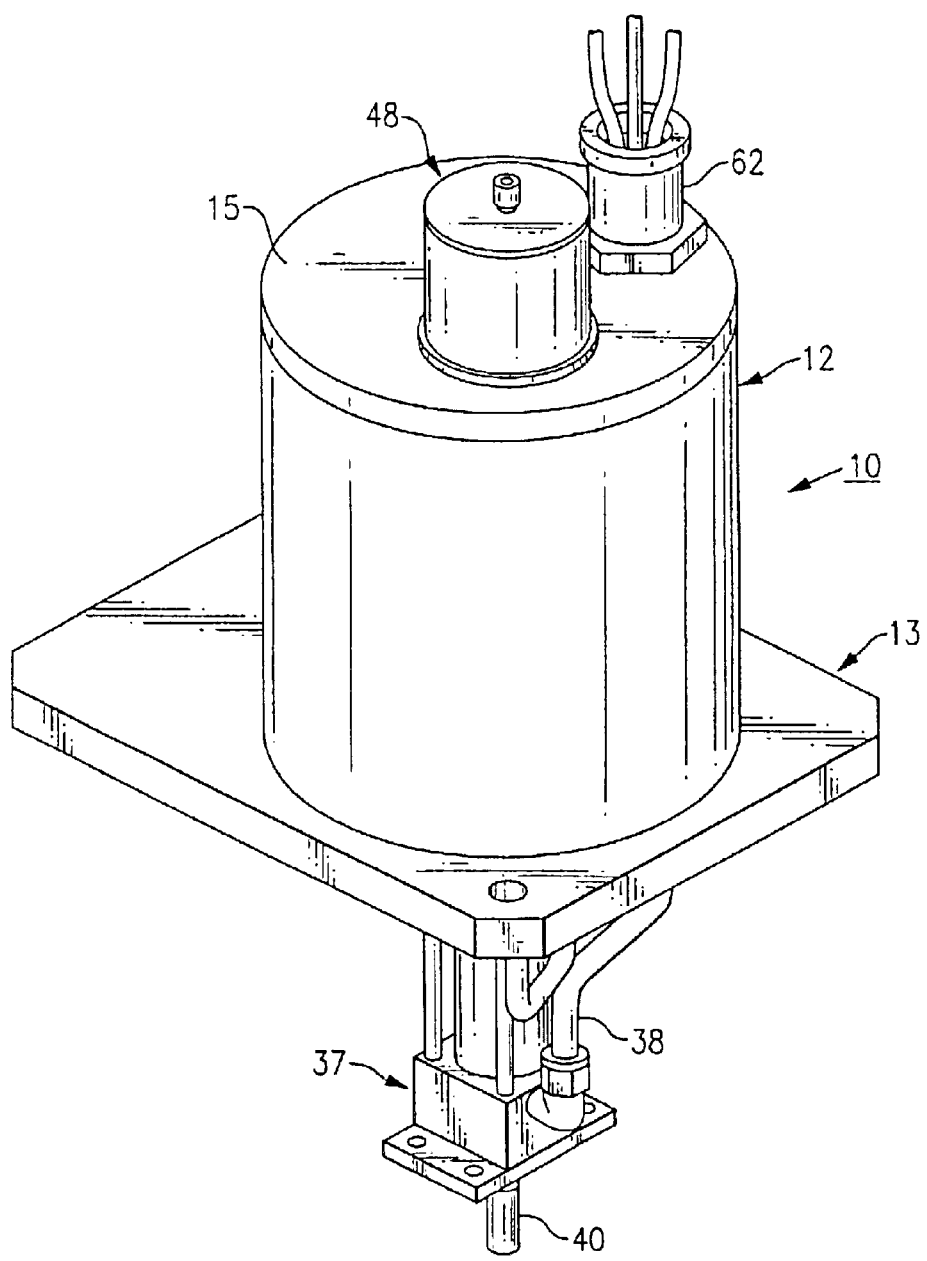
FIG. 1 is a perspective view illustrating an electro-hydrostatic actuator embodying the present invention.
Figure 2:
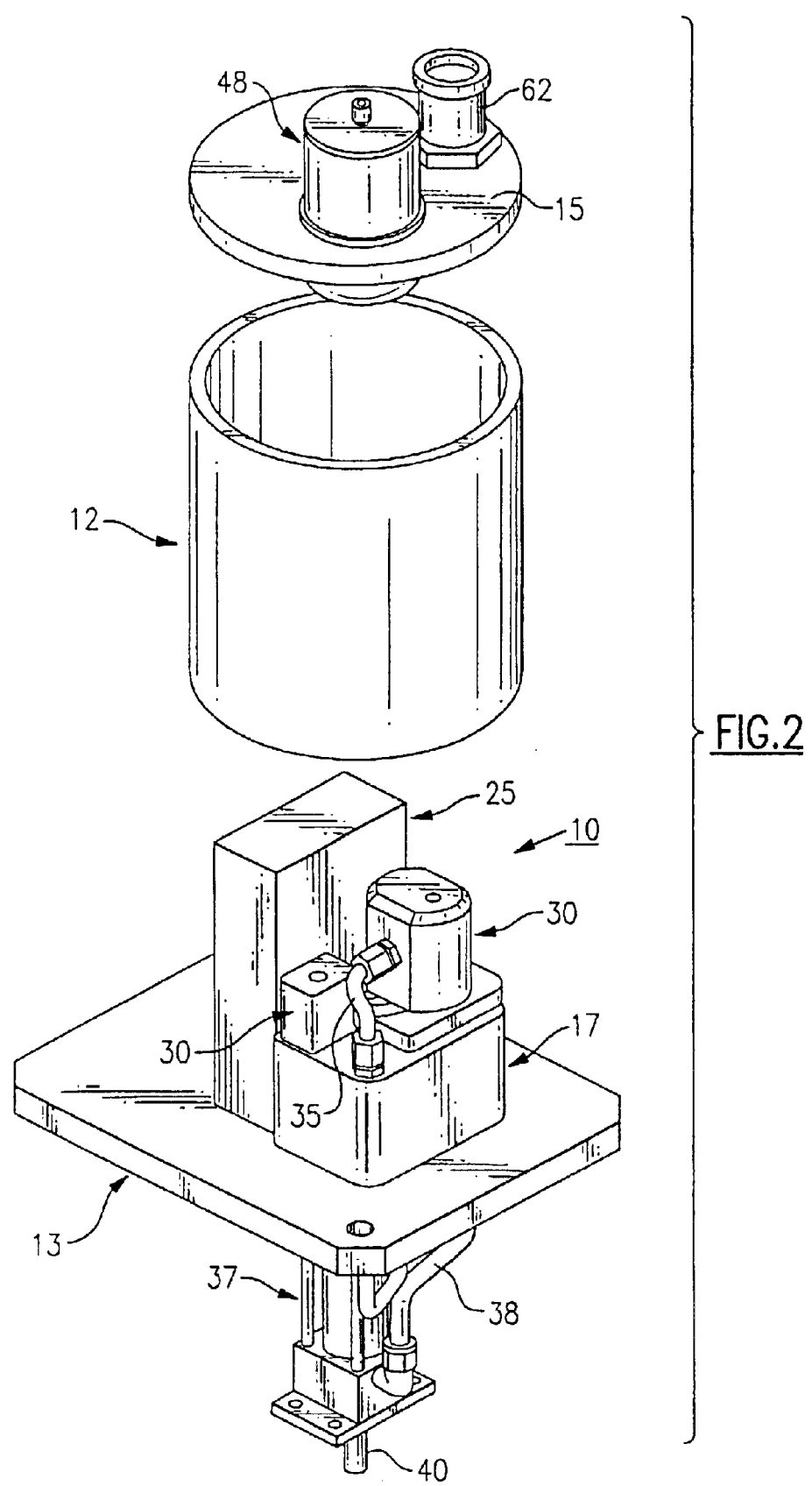
FIG. 2 is an exploded view in perspective showing the outer housing removed from the internal components of the actuator.
Figure 3:
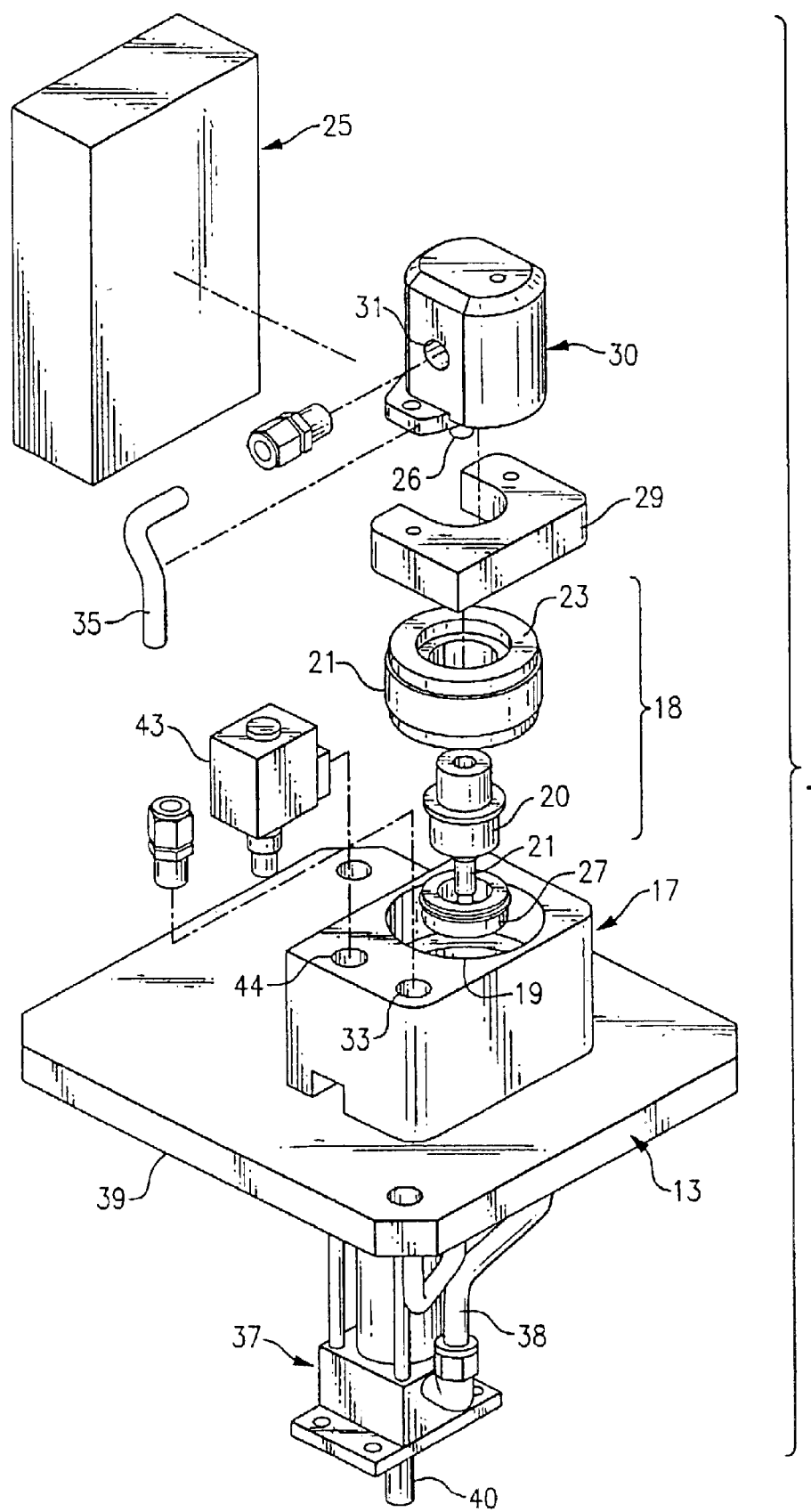
FIG. 3 is an enlarged exploded view in perspective of the internal components of the actuator.

Turning initially to FIGS. 1–3 there is illustrated a linear electro-hydrostatic actuator, generally referenced 10, that embodies the teachings of the present invention. Although, the actuator is ideally suited to control the positioning of a flow control valve, it should be evident from the disclosure below that the actuator is equally adaptable to control the positioning of a wide variety of devices. The actuator includes a cylindrical housing 12 that is seated upon a base plate 13. The top of the housing is closed by a top cover 15. Although not shown, the housing is provided with suitable seals preventing fluid from escaping from the housing.

As illustrated in FIGS. 2 and 3, a support block 17 is mounted upon the base which houses a brushless d.c. motor 18 within a motor compartment 19. The motor includes a permanent magnet 20 that is mounted upon the rotor section 21 of the motor and windings 22 located upon the motor stator 23. The motor is designed to yield high energy density due to low rotating inertia and has improved thermal performance due to the windings having a direct thermal path to the exterior surface of the motor. The brushless motor is commutated by an electronic controller 25 rather than by more conventional brushes and commutator bars. Accordingly, there are no brushes to wear out and little or no maintenance is required over the life of the motor.

An adaptor plate 29 is mounted upon the top of the support block over the motor compartment 19. A gear pump 30 is, in turn, mounted upon the adaptor plate and the drive shaft 26 of the pump is connected to the rotor shaft of the motor by any suitable means. The outlet port 31 of the pump is connected to a supply channel 33 in the support block by a supply line 35. The flow channel outlet is connected to a hydraulic cylinder 37 by means of a second supply line 38. In this embodiment of the invention, the hydraulic cylinder is secured to the bottom surface 39 of the base plate. As will be described in further detail below, the piston rod 40 of the hydraulic cylinder may be connected to the stem of a plunger type valve to regulate the flow through the valve. Although the invention is herein described with the specific reference to a control valve, it should be evident that the actuator may be used to control any linear action type device without departing from the teachings of the present invention.

The interior of the housing is completely filled with a dielectric oil to totally immerse the motor, the pump and the controller in oil. The inlet to the pump is exposed to the reservoir of oil and as will be explained in greater detail below, the pump is arranged to deliver the oil to a chamber within the hydraulic cylinder on one side of a piston that is connected to the piston rod 40.

The controller is mounted upon the base plate immediately adjacent to the support block 17. The controller is microprocessor based and in addition to the motor communication circuitry, the controller contains circuitry relating to an actuator position loop as well as other status monitoring functions which will be described in further detail below. The motor control circuitry monitors the rotor position via a resolver 27 that is mounted concentric to the rotor and provides a sinusoidal current to the motor windings to control motor torque.

A solenoid valve 43 is also immersed in the oil reservoir and is placed in fluid flow communication with a bypass channel 44 formed in the support block 17. The channel connects into the previously noted supply line channel 33 formed in the block. The solenoid valve is normally closed and is opened upon a signal from the controller in the event a fault is detected in one of the monitored function. Opening the solenoid valve causes the supply line to the hydraulic cylinder to be bypassed allowing oil on the pressure side of the piston to be returned rapidly to the reservoir.

A compensating unit 48 is mounted in the top cover 15 of the housing. The unit is shown in further detail in FIG. 5. The compensating unit 48 provides variable volume for fluid expansion and fluid surge. It also provides positive pressure to the oil reservoir 51. The unit is housed within a cylindrical vessel 50 that opens through the top cover into the oil reservoir 51 of the adaptor housing. The cylindrical body of the unit passes through a suitable opening in the cover and a clamping flange 52 is secured to the top cover by any suitable means. A seal 53 is placed between the flange and the top cover to prevent fluid from passing between the two members. A piston 55 is mounted inside the vessel and a close sliding fit is provided between the piston and the inner wall of the vessel. A piston shaft 56 is secured at one end to the piston and passes upwardly through the top wall 57 of the vessel. The shaft is slidably contained within a brushing 58 mounted in the top wall of the vessel. A plate 59 containing an orifice 60 is secured to the bottom of the vessel and, in assembly, the plate is placed in contact with the oil contained in the reservoir so that the oil can pass into the chamber 61 below the piston. A compression spring 62 surrounds the piston shaft which acts to bias the piston downwardly with a given force into contact with the oil in the chamber. The piston shaft also provides a visual indication of the oil level within the reservoir.

A hermetically sealed connector 62 is also contained in the top wall of the housing through which electrical lines are passed into and out of the housing to provide power to the controller as well as carrying data signal to and from the controller.

The operation of the actuator will now be further explained with reference to the schematic drawing illustrated in FIG. 4 wherein the actuator is shown controlling a plug type valve 63. As noted above, the brushless motor 18 is connected to pump 30 via drive shaft 26. The motor is connected to the controller 25 by a suitable electrical line 65. The microprocessor based controller is arranged to monitor the rotor position of the motor through the resolver 27 which communicates with the controller via data line 66.

The pump 30 is arranged to deliver oil from the reservoir 51 to the hydraulic cylinder 37 through supply line 38. The reservoir is shown for explanatory purposes as a tank with the understanding that the controller, the motor and the pump are all completely immersed within the reservoir. A piston 68 is contained within the hydraulic cylinder that divides the cylinder into an upper chamber 70 and a lower chamber 71. The piston is attached to piston rod 40 which in turn passes out of the cylinder through bottom wall 72. The extended end of the piston rod is equipped with a flange 74. The stem 75 of the valve is similarly equipped with a flange 77 and a spring 78 is interposed between the two flanges. The spring is arranged to normally hold the valve in a closed position when the pump is inoperative.

To open the valve, the pump is activated and oil under pressure is delivered into chamber 71 beneath the piston causing the piston to rise within the cylinder and thus lift the valve from its valve seat. A linear variable displacement transducer (LVDT) 80 is operatively associated with the piston rod and provides position data to the controller via line 81. Using data provided by the resolver and the LVDT, the controller can set the valve to any desired position within its operating range. Any fluid that might accumulate in the upper chamber of the hydraulic cylinder is exhausted back to the reservoir via discharge line 83.

The solenoid activated trip valve 43 is mounted in the bypass channel 44 and is arranged to open in response to a trip signal from the controller sent over trip line 85. Opening the solenoid valve provides a path for high pressure oil in the supply line to be discharged rapidly back to the reservoir thereby permitting the control valve to close.

A pressure transducer 86 is mounted in the reservoir to provide pressure information to the controller by means of line 87. The oil temperature in the reservoir is also provided to the controller by a thermal sensor 88 via data line 89. A fluid level sensor 90 is mounted in the reservoir and provides oil level data to the controller via data line 91.

Figure 6:
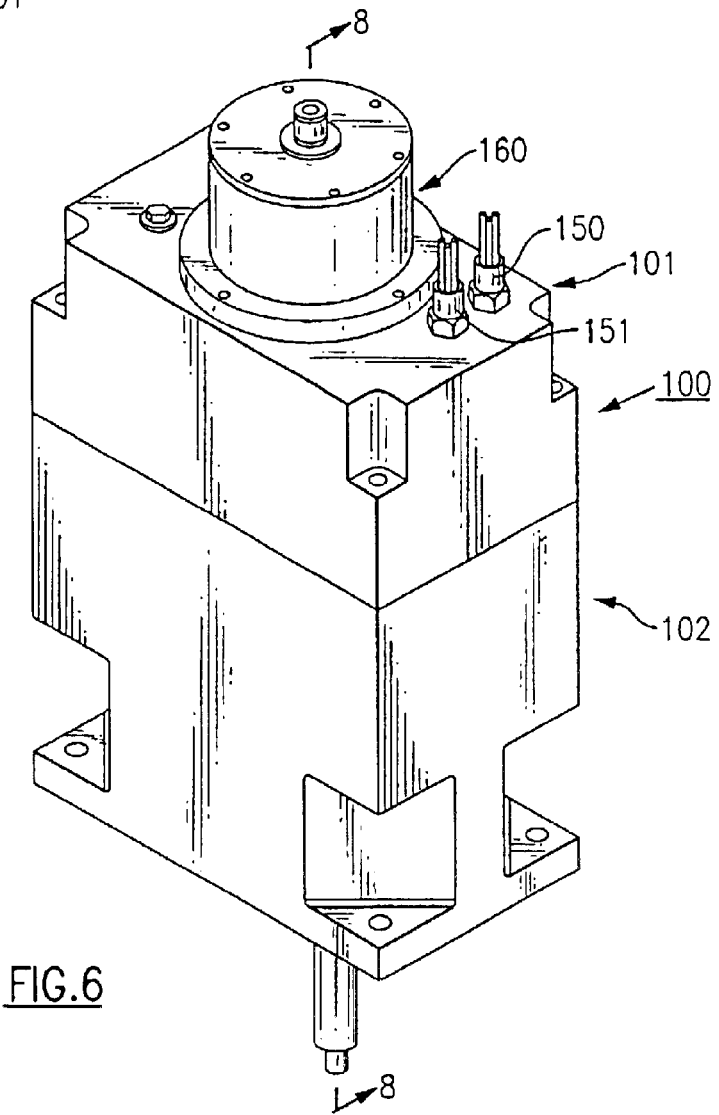
FIG. 6 is a perspective view illustrating a further embodiment of the invention.
Figure 7:
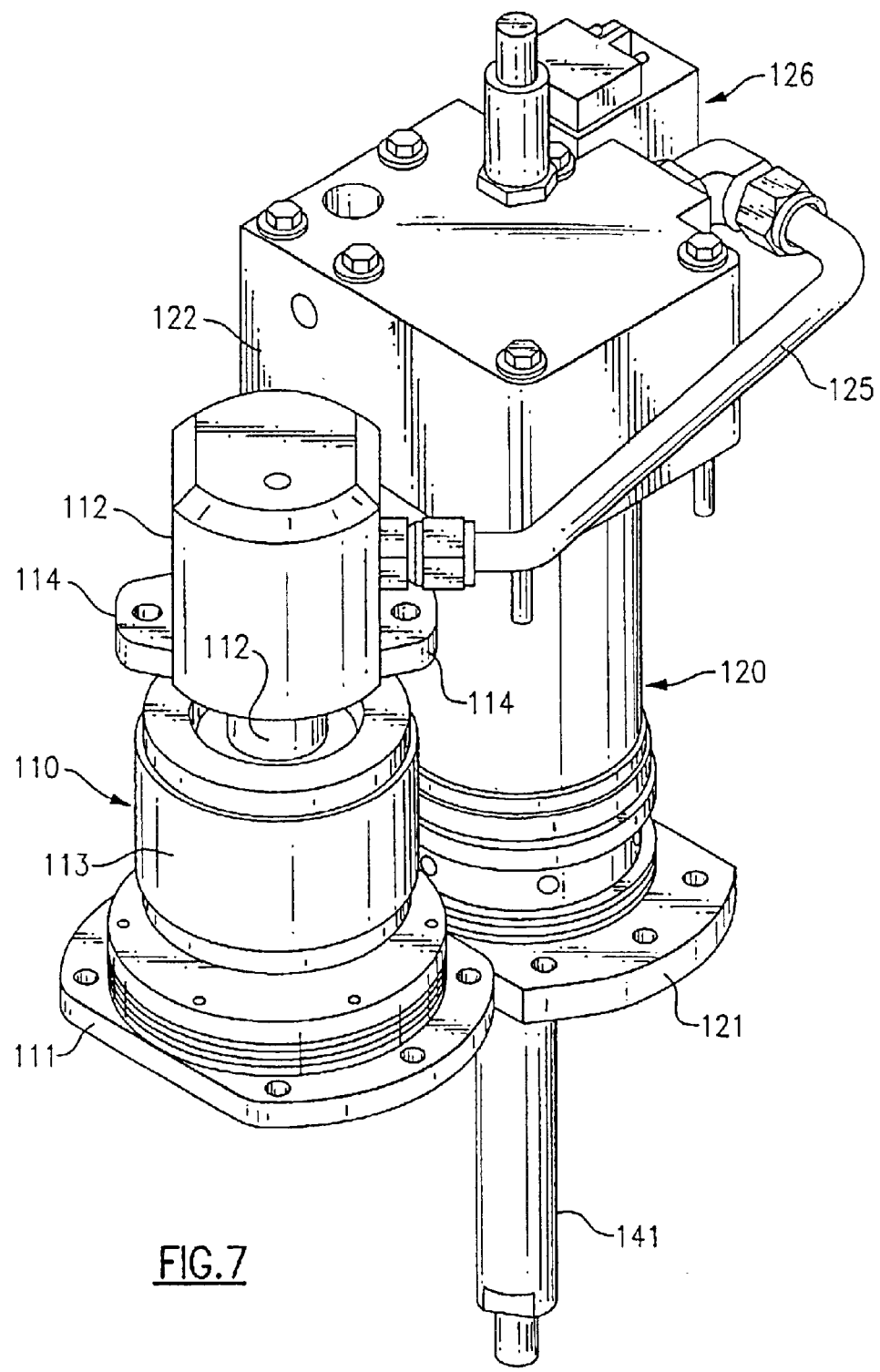
FIG. 7 is an enlarged perspective view showing the internal components of the actuator illustrated in FIG. 6.
Figure 8:
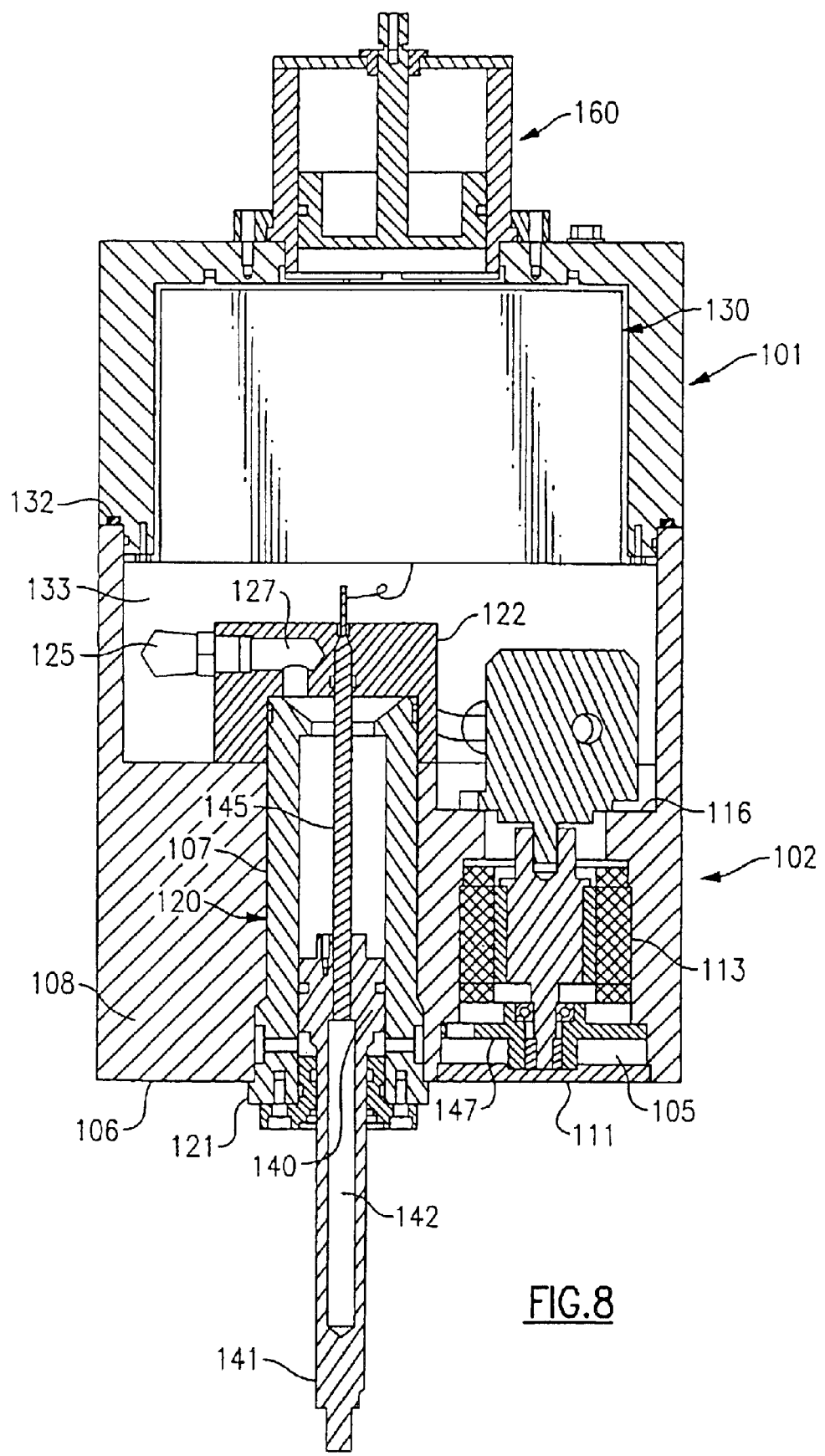
FIG. 8 is a front elevation in section of the actuator illustrated in FIG. 6.

Turning now to FIGS. 6–8, there is illustrated a further embodiment of the invention in which the hydraulic cylinder is brought into a housing 100 along with the motor driven pump and the controller. In this embodiment of the invention the housing 100 is split into two sections that include an upper section 101 and a lower section 102. The lower section is equipped with a contoured base that has a first vertically disposed compartment 105 that passes upwardly into the base through the bottom wall 106 of the lower housing section. A second vertically disposed compartment 107 is similarly passed upwardly into the base through the bottom wall of the lower section of the housing. The second compartment is in parallel alignment-adjacent to the first compartment.

As best illustrated in FIG. 7, the brushless motor 110 as described above is mounted upon a cover plate 111 and a gear pump 112 is mounted over the motor and is coupled to the motor shaft 112. The motor stator is arranged to be supported in a stationary condition within the first compartment 105 as illustrated in FIG. 8 and the cover plate is secured to the base by screws to close the recess. With the top section of the housing removed, the pump is connected to the motor shaft and the mounting flanges 114 of the pump are secured by screws to a horizontally disposed shoulder 116 that surrounds the upper opening to the recess.

The hydraulic cylinder 120 is arranged to be slidably received in the second compartment through the bottom opening thereof. The cylinder is supported in an upright position upon a second cover plate 121 that is arranged, in assembly, to close the bottom opening of the compartment. Again, with the upper section of the housing removed, the cylinder manifold 122 is mounted upon the top of the cylinder and is secured in place using suitable screws. A supply line 125 is connected at one end to the outlet of the pump and at the other end to the inlet channel 127 of the cylinder manifold. A solenoid activated trip valve 126 is secured to one side of the manifold and is connected into the inlet channel of the manifold by means of a bypass channel (not shown).

Turning once again to FIG. 8, the actuator controller 130 is mounted in the upper section 101 of the housing. The upper section of the housing as well as the two cover plates 111 and 121 are sealed in assembly against the lower section of the housing using suitable seals 132 to render the housing leak proof. The interior cavity 133 of the housing is filled with a dielectric oil which totally immerses all of the component parts of the system contained within the housing. As should now be evident, any heat that is generated by the actuator is rapidly transferred to the walls of the housing and dissipated into the surrounding ambient.

A piston 140 is contained within the hydraulic cylinder 120 and a piston rod 141 is secured to the piston and passes out of the housing through cover plate 121. A blind hole 142 passes downwardly through the piston and the piston rod and a linear variable displacement transducer (LVDT) 145 is contained within the hole. The LVDT is arranged to pass upwardly through the cylinder manifold and is connected to the controller to provide piston rod position data to the controller. A resolver 147, as described above, is mounted upon the rotor of the motor and sends rotor position information to the controller. Although not shown, pressure, temperature and fluid level sensors are mounted within the housing which also sends data to the controller for processing. Inlet and outlet leads are passed into and out of the housing by means of sealed connectors 150 and 151. A compensator unit 160 as described above is mounted in the top wall of the upper section of the housing.

As noted above, the piston rod of the actuator may be connected to the stem of a plunger type valve and a spring employed to return the piston to a home position when the pump is de-energized.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. An electro-hydrostatic linear actuator that includes:
   a sealed housing mounted upon a base, said housing containing a reservoir for filling the interior of the housing with a dielectric fluid;
   a motor having a rotor shaft that is connected to a pump; said motor and said pump being immersed in said fluid reservoir so that said pump can draw fluid from said reservoir;
   a hydraulic cylinder located outside of said housing that contains a piston attached to a piston rod that passes out of said cylinder, said piston dividing the cylinder in a first chamber and a second chamber;
   means for biasing said piston rod into a home position;
   a supply line for connecting the pump outlet to one of said chambers;
   and a controller immersed in said fluid that contains circuitry for controlling said motor such that the pump raises the fluid pressure in said one chamber to move the piston rod to a selected operative position.

2. The actuator of claim 1 wherein said hydraulic cylinder is secured to a bottom surface of the base.

3. The actuator of claim 1 wherein said piston rod is connected to a stem of a plunger type valve.

4. The actuator of claim 1 that further includes an adjustable compensating means for maintaining the pressure within the fluid reservoir at a desired level.

5. The actuator of claim 1 that further includes a temperature sensor for detecting the temperature of the fluid in said reservoir and providing temperature data to said control.

6. The actuator of claim 1 that further includes a pressure sensor for detecting the fluid pressure within said reservoir and sending pressure data to said controller.

7. The actuator of claim 1 that further includes a level sensor for detecting the fluid level in said reservoir and providing level data to said controller.

8. The actuator of claim 1 that further includes a resolver associated with the rotor shaft of said motor and providing shaft position data to said controller.

9. The actuator of claim 1 that further includes a linear variable displacement transducer for detecting the position of said piston rod and providing position data to said controller.

10. The actuator of claim 1 that further includes a normally closed solenoid actuated valve that is coupled to said supply line said solenoid actuated valve being arranged to open in response to a signal from said controller to divert fluid from said supply line back to said fluid reservoir.

11. The actuator of claim 1 wherein said pump is a gear pump.

12. An electro-hydrostatic actuator that includes:
   a hermetically sealed housing having a base section, said housing containing a fluid reservoir for filling the interior of the housing with a dielectric oil;
   a brushless motor mounted in a first compartment in said base section of the housing, said motor having a rotor shaft that extends upwardly into said housing;
   a first access cover removably mounted in said base section for closing the first compartment;
   a pump connected to the rotor shaft of said motor for drawing fluid from said reservoir and delivering the fluid at an elevated pressure to a supply line;

a hydraulic cylinder mounted in a second compartment in said base section of said housing adjacent said first compartment;

a second access cover removably mounted in said base section for closing the second compartment;

said cylinder having a piston mounted therein for dividing the cylinder into a first chamber and a second chamber and a piston rod connected to said piston, said piston rod passing out of said cylinder through said second access cover;

means for biasing said piston rod into a home position;

said supply line being connected into one of the cylinder chambers to providing fluid under pressure to said chamber; and a controller being immersed in said fluid reservoir in the upper part of the housing that contains circuitry for controlling said motor such that the pump raises the pressure in said one chamber to move the piston rod to a selected operative position.

13. The actuator of claim 12 wherein said piston rod is connected to the stem of a type valve.

14. The actuator of claim 13 wherein the means for biasing said piston rod includes a spring means acting between the piston rod and the valve stem for normally biasing the piston rod into the home position wherein said valve is closed.

15. The actuator of claim 12 that further includes compensating means for maintaining the pressure within said reservoir at a desired level.

16. The actuator of claim 12 that further includes a temperature sensor for detecting the temperature of fluid in said reservoir and providing temperature data to said controller.

17. The actuator of claim 12 that further includes a level sensor for detecting the fluid level within said reservoir and sending fluid level data to the controller.

18. The actuator of claim 12 that further includes a pressure sensor for detecting the fluid pressure with the reservoir and sending pressure data to said controller.

19. The actuator of claim 12 that further includes a resolver associated in the motor shaft for providing shaft position data to the controller.

20. The actuator of claim 12 that further includes a linear variable displacement transducer for detecting the position of said piston rod and sending position data to said controller.

21. The actuator of claim 12 that further includes a solenoid actuated valve that is coupled to said supply line, said solenoid actuated valve being arranged to open in response to a signal from said controller to divert fluid from the supply line back to said reservoir.

22. The actuator of claim 13 wherein said pump is a gear pump.

* * * * *

UNITED STATES PATENT AND TRADEMARK OFFICE
CERTIFICATE OF CORRECTION

PATENT NO.         : 6,974,115 B2
APPLICATION NO.    : 10/316664
DATED              : December 13, 2005
INVENTOR(S)        : Gabriel Silva It is certified that error appears in the above-identified patent and that said Letters Patent is hereby corrected as shown below:

Drawings:
In Figure 3, one of the reference numerals "21" is incorrect. Please replace with the replacement sheet.

Figure 4:
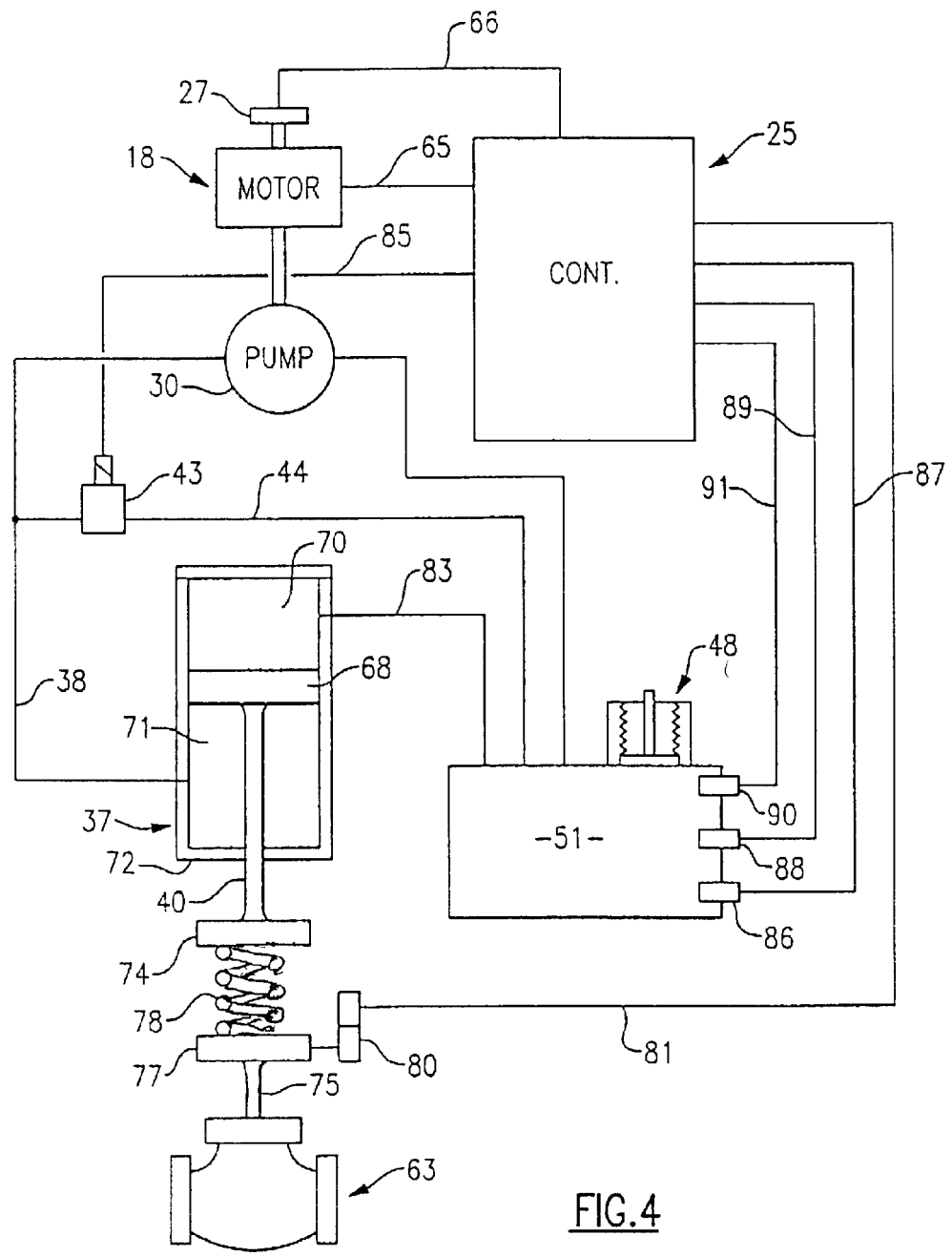
FIG. 4 is a schematic diagram illustrating the functional relationship between the actuator components.

In Figure 4, the reference numeral "26" is missing. Please replace with the replacement sheet.

Figure 5:
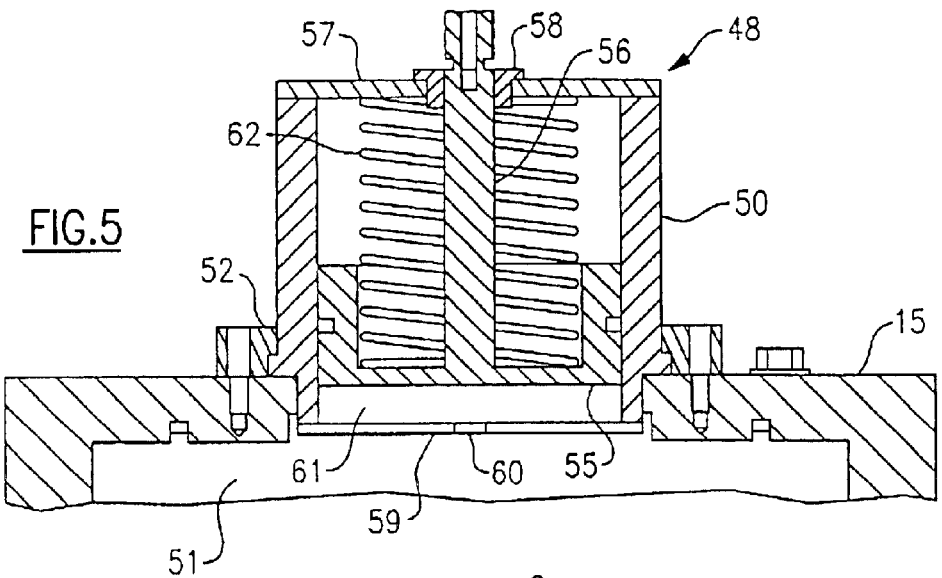
FIG. 5 is a partial view in section showing a pressure compensating unit employed in the practice of the present invention.

In Figure 5, the reference numeral "64" is missing. Please replace with the replacement sheet.

In Figure 7, one of the reference numeral "112" is incorrect. Please replace with the replacement sheet.

Detailed Description of the Preferred Embodiment:
In Column 3, Line 58, the reference numeral "53" should not appear. Please delete the number "53".

In Column 4, Line 7, the reference numeral "62" is incorrect. Please replace with --64--.

In Column4, Line 15, the reference to "brushless motor 18" is incomplete. Please replace with --brushless d.c. motor 18--.

In Column 4, Line 16, the reference to "pump 30" is incomplete. Please replace with --gear pump 30--.

In Column 4, Line 17, the reference to "controller 25" is incomplete. Please replace with --electronic controller 25--.

In Column 5, Line 3, the reference to the "bottom wall" is incorrect. Please replace with --bottom wall 108--.

UNITED STATES PATENT AND TRADEMARK OFFICE
CERTIFICATE OF CORRECTION

PATENT NO. : 6,974,115 B2
APPLICATION NO. : 10/316664
DATED : December 13, 2005
INVENTOR(S) : Gabriel Silva It is certified that error appears in the above-identified patent and that said Letters Patent is hereby corrected as shown below:

In Column 5, Line 9, the reference to "motor shaft 112" is incorrect. Please replace with --motor shaft 115--.

In Column 5, Line 9, the reference to "motor stator" is incomplete. Please replace with --motor stator 113--.

In Column 7, Line 22, the reference to "a type valve" is incomplete. Please replace with --a plunger type valve--.

Signed and Sealed this

Nineteenth Day of September, 2006

JON W. DUDAS
*Director of the United States Patent and Trademark Office*